Patented June 28, 1949

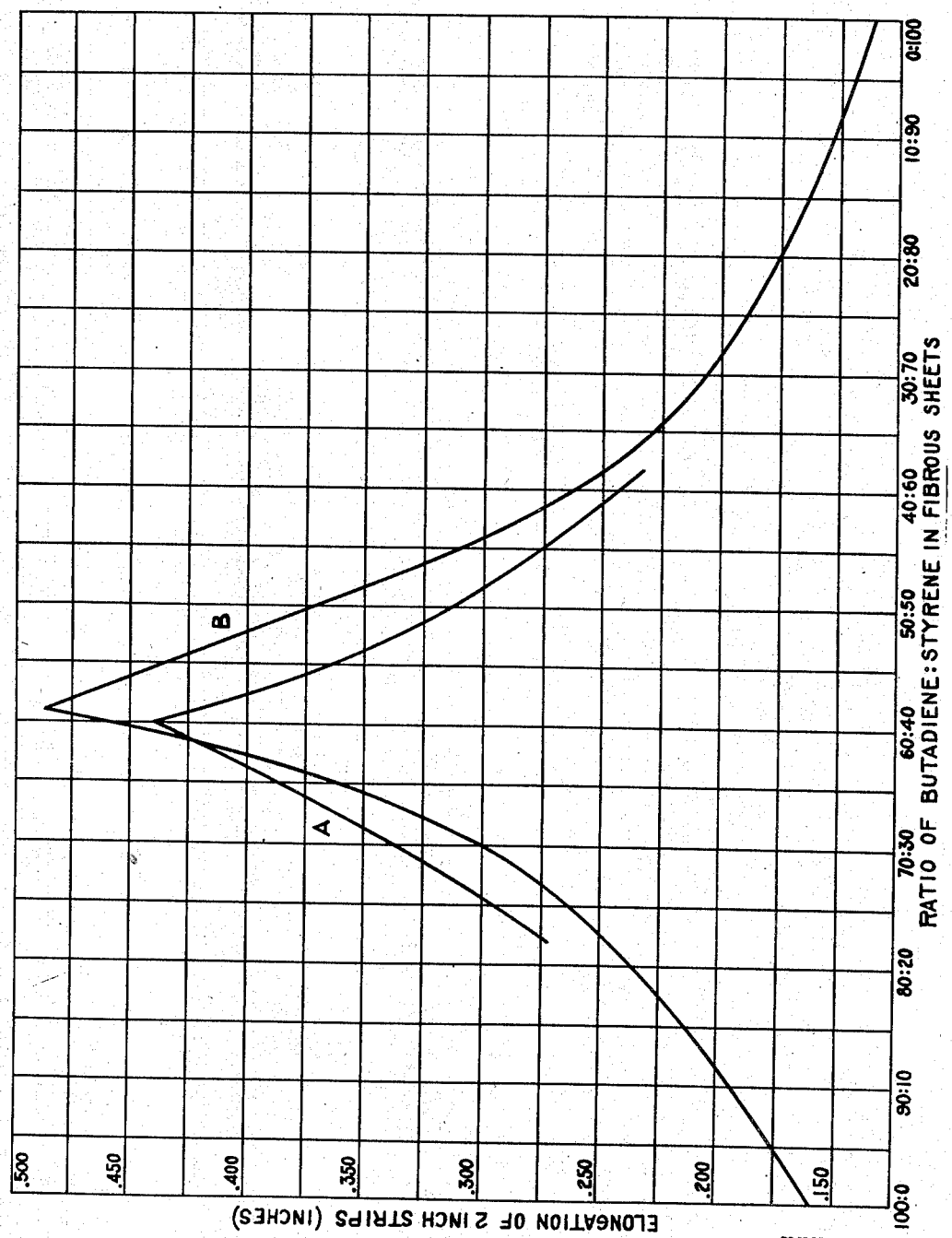

2,474,801

UNITED STATES PATENT OFFICE 2,474,801

FIBROUS SHEETS FORMED FROM AN AQUEOUS SUSPENSION OF A MIXTURE OF FIBERS AND BUTADIENE-STYRENE COPOLYMER

Allen F. Owen, Beaver Falls, N. Y., assignor to Latex Fiber Industries, Inc., Beaver Falls, N. Y., a corporation of New York Application September 15, 1945, Serial No. 616,605

4 Claims. (Cl. 92—3)

This invention relates to improvements in the manufacture of fibrous sheet material.

Fibrous sheet material in which dispersed particles of modifying ingredients, such as rubber, asphalt, synthetic resins, and the like are deposited on the individual beaten fibers while in aqueous suspension in the fiber furnish, and before forming into paper are known. By the present invention, there is deposited on the fibers a material which will produce a fibrous sheet material having an exceptionally high initial tear resistance, that is, high resistance to tearing of the sheet as by hand at an angle to a finished or cut edge. According to the present invention, fibrous sheet material having an exceptionally high initial tear resistance may be prepared by mixing with the beaten fibers, as in the beater or head box or a separate mixing device, an aqueous dispersion of a copolymer of butadiene-1,3 and styrene in which the ratio of butadiene to styrene, by weight, is within the range from 50:50 to 70:30, or a mixture of a plurality of dispersions of copolymers within such range, coagulating the copolymer particles on the fibers, and sheeting or running the mixture off on a machine of the paper-making type in the conventional manner. Aqueous dispersions of copolymers of butadiene-1,3 and styrene are commercially prepared in a known manner by the emulsion polymerization of a mixture of butadiene-1,3 and styrene in the presence of a catalyst.

I have found that the coagulation on the beaten fibers, in the fiber furnish or aqueous suspension of the fibers, of dispersed particles of a copolymer of butadiene-1,3 and styrene having the ratio of butadiene to styrene, by weight, within the range from 50:50 to 70:30, will give a fibrous sheet having a greatly superior initial tear resistance as compared to similar sheets made with butadiene-styrene copolymers having percentages of butadiene below 50 and above 70, and also as compared to a similar sheet made with natural rubber latex. There is no known quantitative test for this property of initial tear resistance, but testing by hand as by tearing or attempting to tear a sheet at an angle to a straight cut or finished edge, will readily give a qualitative or comparative test on various sheets. Such hand tests will readily show the superior initial tear resistance of sheets made with a deposit of copolymers of butadiene-1,3 and styrene having the ratio of butadiene to styrene, by weight, within the range from 50:50 to 70:30 over sheets made with a deposit of emulsion polymerized copolymers of butadiene-1,3 and styrene outside such range, and also over similar sheets made with the same amount of rubber deposited from natural rubber latex. This appears surprising when one considers the tensile strength of dried natural latex and dried films of aqueous dispersions of the butadiene-styrene copolymer, dried Hevea latex films having tensile strengths of about 3000 to 4000 pounds per square inch, and dried films of dispersions of copolymers of butadiene-1,3 and styrene with about 70% and 50% of butadiene, respectively, having tensile strengths of about 200 to 400 pounds per square inch and about 800 to 1200 pounds per square inch, respectively. The superior initial tear resistance of the fibrous sheets of the present invention is believed to result from the superior type of bonding effect exerted by the copolymers in the stated ratio range on the fibers of the sheet material. While direct methods of quantitatively measuring the initial tear resistance of fibrous sheets are not known, quantitative stretch tests on fibrous sheets made with aqueous dispersions of copolymers of butadiene-1,3 and styrene within the butadiene and styrene ratio range of the present invention show unexpected abnormally high elongations at break as compared with fibrous sheets similarly made with aqueous dispersions of copolymers outside the butadiene-styrene ratio range of the present invention, and these stretch results do follow the peak in initial tear resistance as measured by the aforementioned hand test for qualitatively determining initial tear resistance. Thus, I have found that those sheets which show a high resistance to initial tear as when the sheet is torn or attempted to be torn by hand at an angle to a finished edge have a higher elongation at break than sheets having a low initial tear resistance, and that the elongation at break measurements qualitatively follow the initial tear resistance, and are to my knowledge the best quantitative measurements of such initial tear resistance. Standard Elmendorf tear measurements and Mullen bursting strength measurements in no way follow the initial tear resistance. Likewise tensile strength measurements do not follow the initial tear resistance as will be seen in the Table I below where tensile strengths and elongation at break measurements will be discussed in conjunction with a series of runs on an untreated fibrous sheet and on sheets prepared from an aqueous suspension of fibers on which particles of rubber latex and particles of copolymers of different proportions of butadiene and styrene were coagulated.

The drawing is a chart illustrating the unexpectedly superior results of the fibrous sheet materials of the present invention, and showing elongation at break measurements of fibrous sheet materials within and without the present invention as described in detail in the tables below.

As one illustration of the method of carrying out the invention, paper making fibers are first beaten in a conventional paper beating engine. When the beating operation has been carried to the desired degree of hydration of the pulp, the beater roll is raised off the bed plate. The beater roll while so raised serves merely as a means of circulating the beaten fibrous mass in the beater. An aqueous dispersion, such as an emulsion polymerizate of butadiene-1,3 and styrene in which the ratio of butadiene to styrene, by weight, is from 50:50 to 70:30 is added to the beater while the beater roll is raised and continued in operation, thus bringing about a uniform distribution of the fibers and dispersed copolymer particles. Any desired amounts of copolymer may be added to the beater for preparation of a sheet of the desired characteristics, generally from 3 to 100 parts by weight of copolymer being added per 100 parts dry weight of fiber in the beater. After a uniform distribution of the dispersed copolymer particles and the fibers is obtained, the copolymer particles are coagulated on the fibers by a coagulating process. The coagulation may be made to take place in the beater or at any stage of the paper making operations between the beating and the sheeting operation, as in the head box or in a separate mixing device, as by the addition of aluminum sulfate similarly to the coagulation of natural rubber particles from latex onto the fibers in the manufacture of conventional fiber-rubber sheet materials. Such coagulation will also deposit any sizing materials that may have been added to the fiber furnish. After the dispersed copolymer has thus been coagulated on the fibers, the fibrous suspension is formed into a sheet by running off on a conventional paper making machine.

Compounding ingredients, fillers, softeners, plasticizers, may be admixed with the copolymer dispersion or added separately to the fiber furnish. If desired, vulcanizing ingredients for the copolymer of butadiene and styrene may be similarly added and vulcanization made to take place after forming into sheets by heating in a known manner. The fibrous sheet materials of the present invention have a somewhat greater softness and flexibility in the range of butadiene-to-styrene ratio between 55:45 and 70:30 and a somewhat greater stiffness and rattle in the range between 55:45 and 50:50. The former type of sheet is particularly adapted for use as insole and midsole materials, and in the artificial leather industry, as, for example, a base stock for coated and embossed artificial leathers. The sheets having a range of butadiene-to-styrene ratio between 55:45 and 50:50 are particularly adapted for use as shoe counters and box toes, and, with relatively low percentages of the copolymer, for tag stock, bonds and ledger papers, or other papers or artificial leather base where density and stiffness are desired.

In order to show the different physical characteristics of untreated fibrous sheet material, and fibrous sheet material where natural rubber latex particles were coagulated on the fibers, and fibrous sheet material where copolymers of butadiene-1,3 and styrene both within the range of the present invention and outside such range were coagulated on the fibers, a series of runs were made. A master batch of paper making fiber was prepared and this was used in all the runs to insure uniformity of the fiber stock. In each run the beaten fiber was allowed to stir around with the roll raised for ten minutes. It was then made alkaline by the addition of a small amount of caustic soda, the latex or aqueous dispersion of copolymer was added, and the suspension was stirred around for another three minutes, followed by coagulation by the addition of aluminum sulfate to a pH of about 4. In all runs the amount of copolymer dispersion or Hevea latex added to the fiber furnish was equivalent to 25 parts, by weight, of copolymer or rubber solids per 100 parts dry weight of fiber. Sheets were made up in a standard sheet mold to a ream weight of 260 lbs., that is, on the basis of 480 sheets, 24 x 36 inches, weighing 260 lbs. Sheets were dried on a standard cylinder drier and given one pass through a calender. The sheets were about .025" thick. Tensile strengths and elongations at break of strips 2" long and 1" wide were run on a standard B. F. Perkins tensile tester, after the sheets had stood 24 hours at 51% relative humidity. The tensile strength and elongation at break of an ordinary fiber sheet (control), of a sheet made with natural rubber latex, and of sheets made with various copolymers of butadiene-1,3 and styrene, are shown in the following table:

*Table I*

| Material Coagulated on Fibers | Tensile Strength, Lbs. per Sq. In. | Elongation at Break in Inches for 2" Test Strip 1" Wide |
|---|---|---|
| None (control) | 56.4 | .139 |
| Natural latex | 92.3 | .249 |
| Butadiene-1,3 to styrene ratio 75:25 | 50.9 | .293 |
| Butadiene-1,3 to styrene ratio 70:30 | 57.2 | .337 |
| Butadiene-1,3 to styrene ratio 65:35 | 61.8 | .383 |
| Butadiene-1,3 to styrene ratio 60:40 | 64.7 | .438 |
| Butadiene-1,3 to styrene ratio 55:45 | 73.8 | .363 |
| Butadiene-1,3 to styrene ratio 50:50 | 83.4 | .316 |
| Butadiene-1,3 to styrene ratio 45:55 | 89.7 | .275 |
| Butadiene-1,3 to styrene ratio 40:60 | 95.9 | .243 |

The control sheet could be readily torn from the edge with the hands as could the sheet made with natural rubber latex, although, of course, the sheet made with latex was much stronger and harder to tear. The sheets having respectively, 45% and 40% of butadiene in the copolymer were not appreciably different from the latex sheet in their response to initial tear by the hand test. The sheet having 75% of butadiene in the copolymer appeared weaker than the latex sheet in its response to initial tear by the hand test, and also differed from the latex sheet in that it was soft and oily, whereas the latex sheet had a relatively short and snappy tear. On the other hand, the sheet made with a copolymer having 60% of butadiene had a tremendously increased resistance to initial tear and could not be torn by hand. Hand testing also showed a greatly increased initial tear resistance in the cases of the sheets made with copolymers having percentages of butadiene of 50, 55, 65, and 70, as compared with the sheets made with natural rubber latex and with percentages of butadiene of 40, 45 and 75. The initial tear resistance follows the stretch characteristics or elongation at break of the sheets, the initial tear resistance as shown by hand tests being a maximum with the copolymer having a butadiene to styrene ratio of 60:40 and the elongation at break also being a maximum with this copolymer ratio. The elongation at break which I have found to be our best measure of initial tear resistance reaches a very sharp peak in a sheet made with a copolymer of approximately 60 parts butadiene and 40 parts styrene as shown in the curve A in the drawing which is a graph of the results in Table I of the elongations at break of the sheets made with aqueous dispersions of copolymers having a butadiene to styrene ratio of 75:25 to 40:60. Such a sharp peak in a curve measuring the initial tear resistance of sheets made with the various copolymers of butadiene and styrene is certainly surprising and wholly unexpected when one considers that the tensile strength gradually increases from about 50 pounds per square inch for the butadiene to styrene copolymer ratio of 75:25 to about 96 pounds per square inch for the butadiene to styrene copolymer ratio of 40:60. The sheets made with copolymers within the narrow range of butadiene to styrene ratios of 50:50 to 70:30 encompass the peak of elongation curve, and these same sheets also represent the greatest resistance to initial hand tear. For a product of this nature as previously described to have high initial tear resistance, the elongation at break of a 2" x 1" strip must be 0.3 inch or more, that is, at least 15%.

The results of elongation at break measurements on fiber sheets similar to those shown in Table I but made with other copolymers of butadiene and styrene obtained from a different source and having butadiene to styrene ratios through the entire range and also with polybutadiene (100% butadiene polymer) and with polystyrene (100% styrene polymer) are shown in the following table:

Table II

| Material Coagulated on Fibers | Elongation at Break in Inches for 2" Test Strip 1" Wide |
|---|---|
| Polybutadiene-1,3 | .157 |
| Butadiene-1,3 to styrene ratio 85:15 | .221 |
| Butadiene-1,3 to styrene ratio 75:25 | .260 |
| Butadiene-1,3 to styrene ratio 65:35 | .363 |
| Butadiene-1,3 to styrene ratio 50:50 | .376 |
| Butadiene-1,3 to styrene ratio 40:60 | .255 |
| Butadiene-1,3 to styrene ratio 30:70 | .209 |
| Butadiene-1,3 to styrene ratio 15:85 | .147 |
| Polystyrene | .146 |

The results of the above Table II are shown in the curve B in the drawings where the maximum elongation at break is again found in a sheet made with a butadiene to styrene ratio of about 60:40. In this case also the elongations at break recede sharply from the peak with increased butadiene ratios of the copolymer to polybutadiene and also recede sharply from the peak with increased styrene ratios of the copolymer to polystyrene where the elongations at break approximate the elongations at break of the control or untreated sheet. Curves A and B of the drawing clearly illustrate the surprising increase in resistance to initial edge tear that I have found to be the case in fibrous sheet materials made according to the invention with copolymers of butadiene and styrene in which the ratio of butadiene to styrene is within the range from 50:50 to 70:30.

This application is a continuation-in-part of my application Serial No. 529,040, filed March 31, 1944, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An article of manufacture comprising a sheet containing papermaking fibers and about 25 parts by weight of an emulsion polymerized copolymer of butadiene-1,3 and styrene per 100 parts by weight of papermaking fibers, said sheet being formed from an aqueous suspension of a mixture of papermaking fibers and dispersed particles of the copolymer of butadiene-1,3 and styrene in which the ratio of butadiene to styrene, by weight, is within the range from 50:50 to 70:30, said copolymer being mixed with said fibers while said fibers are in aqueous suspension and prior to forming said fibers into a sheet.

2. An article of manufacture comprising a sheet containing papermaking fibers and an emulsion polymerized copolymer of butadiene-1,3 and styrene in amounts from 3 to 100 parts by weight of the copolymer per 100 parts by weight of papermaking fibers, said sheet being formed from an aqueous suspension of a mixture of papermaking fibers and dispersed particles of the copolymer of butadiene-1,3 and styrene in which the ratio of butadiene to styrene, by weight, is within the range from 50:50 to 70:30, said copolymer being mixed with said fibers while said fibers are in aqueous suspension and prior to forming said fibers into a sheet.

3. An article of manufacture comprising a sheet containing papermaking fibers and an emulsion polymerized copolymer of butadiene-1,3 and styrene in amounts from 3 to 100 parts by weight of the copolymer per 100 parts by weight of papermaking fibers, said sheet being formed from an aqueous suspension of a mixture of papermaking fibers and dispersed particles of the copolymer of butadiene-1,3 and styrene in which the ratio of butadiene to styrene, by weight, is approximately 60:40, said copolymer being mixed with said fibers while said fibers are in aqueous suspension and prior to forming said fibers into a sheet.

4. An article of manufacture comprising a sheet containing papermaking fibers a copolymer of butadiene-1,3 and styrene in an amount of 3 parts by weight of the copolymer per 100 parts by weight of papermaking fibers, said sheet being formed from an aqueous suspension of a mixture of papermaking fibers and dispersed particles of the copolymer of butadiene-1,3 and styrene in which the ratio of butadiene to styrene, by weight, is 50 parts butadiene to 50 parts styrene, said copolymer being mixed with said fibers while the fibers are in aqueous suspension and prior to forming said fibers into a sheet.

ALLEN F. OWEN.

REFERENCES CITED

The following references are of record in the file of this patent:

UNITED STATES PATENTS

| Number | Name | Date |
|---|---|---|
| 1,836,021 | Gibbons | Dec. 15, 1931 |
| 2,330,352 | Henderson | Sept. 28, 1943 |

FOREIGN PATENTS

| Number | Country | Date |
|---|---|---|
| 511,865 | Great Britain | Aug. 25, 1935 |

OTHER REFERENCES

India Rubber World, Oct. 1942, page 34.
Paper Trade Journal, Sept. 28, 1944, pages 33 to 36.
Technical Association Papers, Series 25, page 311 (1942).
Technical Association Papers, Series 26, pages 516 to 518 (1943).
Technical Association Papers, Series 27, page 207 (1944).